Patented Aug. 26, 1930

1,774,359

UNITED STATES PATENT OFFICE

THOMAS H. DONAHUE, OF EAST CHICAGO, INDIANA

PROCESS FOR REFINING ANTIMONIAL LEAD

No Drawing.    Application filed January 17, 1929. Serial No. 333,244.

This invention relates to a process for refining antimonial lead.

Alloys of lead and antimony find numerous uses in the arts, for example, in the manufacture of storage battery plates, cable sheathing, bearing metals, type metal and corrosion resistant chemical equipment. For many purposes the presence of impurities in the alloy is detrimental, especially the presence of arsenic or copper. Antimonial lead produced in the recovery of scrap metals and in the refining of lead bullion is a crude material which contains such impurities and which is unsuited for many purposes until it has been refined.

The usual process for removing arsenic and copper from antimonial lead comprises two operations, which may be carried out in a kettle. In the first operation the temperature is adjusted to slightly above the melting point of the metal, and an appropriate amount of sulphur is added and stirred into the metal. The temperature is then raised and stirring is continued until the dross is changed to a dry black powder, which is skimmed off. This treatment removes copper. In the second operation the temperature of the molten metal is increased to 900°–1000° F., caustic soda is added and stirred into the molten metal until it becomes stiffened, and the skim thus formed containing the separated arsenic is removed. Usually several treatments with caustic soda are required to reduce the arsenic content to the desired degree.

The object of my invention is to remove arsenic and/or copper from antimonial lead containing the same, by the use of metallic zinc. I have found that both arsenic and copper can be removed in one operation by this method. In the practice of the invention molten crude antimonial lead is treated with zinc at suitable temperatures above the melting point of zinc, the temperature is lowered to approximately the freezing point of the alloy, and the dross thus formed, containing the impurities, is skimmed off. The drossed metal may be and preferably is treated for the removal of zinc. The following description of the refining of one charge of crude antimonial lead will explain the method of operation.

The crude metal weighing 8400 lbs. was melted in a refining kettle and the temperature maintained constant at about 600° F. for about an hour without disturbing the molten metal so that the dross would have an opportunity to float to the surface. The dross weighing about 400 lbs. was skimmed off by means of a long-handled scoop shovel perforated with numerous ⅛ inch holes to drain off the molten metal. Drossing in this manner eliminated a considerable part of the copper and arsenic originally present, as shown by the following analyses:

|      | Crude metal | Drossed metal | Dross |
|------|-------------|---------------|-------|
| % Sb | 15.45       | 15.00         | 22.70 |
| Cu   | 0.61        | 0.39          | 4.92  |
| As   | 0.25        | 0.19          | 1.45  |

After drossing the temperature was increased to about 900° F. and about 60 lbs. of zinc were added. At this temperature the zinc melted readily and was then thoroughly mixed in the bath by means of a mechanical stirrer of the type commonly used by lead refiners. The stirrer was removed and the contents of the kettle left undisturbed. Meanwhile the temperature was gradually lowered and dross floated to the surface. This dross was skimmed off with the perforated shovel, previously described, care being taken not to disturb the bath more than necessary. The drossing was continued until the freezing point of the metal was reached. The weight of dross produced and its analysis at different temperatures are shown below:

| Temperature interval in degrees Fahrenheit | Weight of dross in pounds |
|--------------------------------------------|---------------------------|
| 900–700                                    | 225                       |
| 700–650                                    | 190                       |
| 650–600                                    | 220                       |
| 600–550                                    | 270                       |
| 550–500                                    | 210                       |
|                                            | 1115                      |

| Analysis of dross collected between: | 900–700° F. | 650–600° F. | 550–500° F. |
|---|---|---|---|
| % Cu | 0.34 | 0.66 | 1.22 |
| As | 1.35 | 1.49 | 0.78 |

| Analysis of metal: | Before zinc treatment | After zinc treatment |
|---|---|---|
| % Cu | 0.39 | 0.075 |
| As | 0.19 | 0.060 |
| Zn | | 0.16 |
| Sb | 15.0 | 13.2 |

The metal after the zinc treatment contained 0.16% of zinc which was removed by increasing the temperature to about 850° F., adding about 50 pounds of lead chloride, and mixing for about an hour with the mechanical stirrer. The reaction for the removal of zinc is:

$$Zn + PbCl_2 = Pb + ZnCl_2$$

The stirrer was then removed and the zinc chloride floating on the surface was skimmed off, completing the refining operation.

The foregoing explanation is merely illustrative of one particular application of the invention. Considerable variation in the amount of zinc added is necessary depending upon the amount of impurities present. Each pound of arsenic requires about 1.5 pounds of zinc and each pound of copper requires about 1.0 pound of zinc to effect removal. The process is not limited to the specific removal of arsenic and copper; other impurities may be present in crude antimonial lead which will also be removed.

The zinc remaining in the antimonial lead after the zinc treatment may be removed by any suitable process. However, in the preferred form of the invention, the use of lead chloride is recommended.

I claim:

1. The process of refining crude antimonial lead containing copper and arsenic which comprises mixing zinc with the molten metal and removing the dross thus formed.

2. The process of refining crude antimonial lead which comprises mixing zinc with the molten metal, removing the dross thus formed and subjecting the drossed metal to an operation for the removal of zinc.

3. The process of refining crude antimonial lead containing copper and arsenic which comprises thoroughly intermingling zinc with the molten metal at a temperature above the melting point of zinc, lowering the temperature, and removing the dross formed on the surface of the bath.

4. The process of refining crude antimonial lead containing copper and arsenic as impurities which comprises thoroughly intermingling a mixture of molten zinc and the molten antimonial lead at a temperature of about 900° F., allowing dross to collect while gradually lowering the temperature, separating the dross and continuing the drossing operation until the freezing point of the metal is reached.

5. The process of refining crude antimonial lead which comprises mixing zinc with the molten metal and removing the dross thus formed.

6. The process of refining crude antimonial lead which comprises thoroughly intermingling zinc with the molten metal at a temperature above the melting point of zinc, lowering the temperature, and removing the dross formed on the surface of the bath.

7. The process of refining crude antimonial lead which comprises thoroughly intermingling a mixture of molten zinc and the molten antimonial lead at a temperature of about 900° F., allowing dross to collect while gradually lowering the temperature, separating the dross and continuing the drossing operation until the freezing point of the metal is reached.

In testimony whereof, I affix my signature.

THOMAS H. DONAHUE.